United States Patent
Ueda et al.

(10) Patent No.: US 8,305,351 B2
(45) Date of Patent: Nov. 6, 2012

(54) DISPLAY INPUT DEVICE

(75) Inventors: Nobuyuki Ueda, Nara (JP); Yuji Okamoto, Kyoto (JP); Shuhji Fujii, Kizugawa (JP); Kaoru Ishikura, Kyoto (JP); Atsushi Ogo, Kizugawa (JP); Kenji Takahashi, Yamatokoriyama (JP); Nobuyasu Yamada, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 976 days.

(21) Appl. No.: 12/348,943

(22) Filed: Jan. 6, 2009

(65) Prior Publication Data

US 2009/0189870 A1 Jul. 30, 2009

(30) Foreign Application Priority Data

Jan. 25, 2008 (JP) ................. 2008-015010

(51) Int. Cl.
*G06F 3/041* (2006.01)
(52) U.S. Cl. ...................................... 345/173
(58) Field of Classification Search .................. None
See application file for complete search history.

(56) References Cited

U.S. PATENT DOCUMENTS

| | | | | |
|---|---|---|---|---|
| 4,992,929 A | * | 2/1991 | Yamada et al. | 700/84 |
| 5,950,045 A | * | 9/1999 | Nomura et al. | 399/81 |
| 6,285,842 B1 | | 9/2001 | Katamoto et al. | |
| 6,692,167 B2 | * | 2/2004 | Nakadaira et al. | 400/61 |
| 7,158,123 B2 | | 1/2007 | Myers et al. | |
| 7,948,476 B2 | * | 5/2011 | Goto et al. | 345/173 |
| 2002/0005839 A1 | * | 1/2002 | Nojiri | 345/173 |
| 2004/0150668 A1 | | 8/2004 | Myers et al. | |
| 2005/0200611 A1 | * | 9/2005 | Goto et al. | 345/173 |
| 2007/0195064 A1 | * | 8/2007 | Morioka | 345/173 |
| 2009/0189870 A1 | * | 7/2009 | Ueda et al. | 345/173 |

FOREIGN PATENT DOCUMENTS

| | | |
|---|---|---|
| JP | 10-63955 A | 3/1998 |
| JP | 10-141974 A | 5/1998 |
| JP | 11-134160 A | 5/1999 |
| JP | 2002-176578 A | 6/2002 |
| JP | 2004-234661 A | 8/2004 |
| JP | 2008-016053 A | 1/2008 |

* cited by examiner

*Primary Examiner* — Peter Vincent Agustin

(74) *Attorney, Agent, or Firm* — Birch, Stewart, Kolasch & Birch, LLP

(57) ABSTRACT

To provide a display input device including: a display controller for displaying a control frame on a display portion; a touch input detector for detecting a touch input to the touch panel portion; and a setup item displaying portion for superimposing setup items on the control frame in accordance with the position of the touch input while the touch input is being detected by the touch input detector.

4 Claims, 14 Drawing Sheets

| Coordinates | Current State | Operation |
|---|---|---|
| ⋮ | ⋮ | ⋮ |
| (x1, y1) − (x2, y2) | Control frame | Setup of $2^{nd}$ paper feed cassette |
| ⋮ | ⋮ | ⋮ |
| (x3, y3) − (x4, y4) | Setup of $2^{nd}$ paper feed cassette | A 4 |
| ⋮ | ⋮ | ⋮ |

DISPLAY INPUT DEVICE

This Nonprovisional application claims priority under 35 U.S.C. §119(a) on Patent Application No. 2008-15010 filed in Japan on 25 Jan. 2008, the entire contents of which are hereby incorporated by reference.

BACKGROUND OF THE INVENTION (1) Field of the Invention

The present invention relates to a display input device and the like including a display portion and a touch panel portion.

(2) Description of the Prior Art

Conventionally, in order to designate various operational settings, there have been known display input devices through which setting items and operating modes of an apparatus are determined using a menu form.

As an example, patent document 1 (Japanese Patent Application Laid-open 2002-176578) discloses a method of displaying list representations of taken pictures, music information etc. on a LCD monitor in a camera that can be selectively used in audio and camera modes.

Also, as a display input device, a device using a display portion and a touch panel portion has been known. In such a device, setup items are displayed in a menu form on the display portion so as to allow the user to touch the relevant portion to select the item in the menu.

For example, FIG. 1 shows a control frame when a conventional display input device is applied to a digital multifunctional machine. Here, when the user touches a region R900, the touch panel portion which is integrally formed with the display portion that displays the control frame, detects the condition of being touched. As a result, a setup frame corresponding to region R900 is displayed. That is, when region R900 is touched, an original setup frame shown in FIG. 2 is displayed. In this frame, the user is allowed to designate the original size.

Similarly, when a region R902 is touched, a setup frame shown in FIG. 3 is displayed. In this frame, the user is permitted to set the size of paper to be fed.

In the conventional display input device, when setting is performed in the control frame, it is needed to change setup frames from one to another. Therefore, even when, for example, the user just wants to make sure of the setting items in the control frame, it is previously necessary to switch the display into the setup frame.

Further, when a plurality of settings need to be input, it is previously necessary to switch the control frame to setup frames and vice versa a number of times. Hence, it cannot be said that user-friendly operativity is provided.

Further, when a plurality of items need to be designated in the same setup frame, it is necessary to return to the control frame after one item has been set in a setup frame and then transit the display state into another setup frame once again. So it cannot be said that user-friendly operativity is provided.

SUMMARY OF THE INVENTION

It is therefore an object of the present invention to provide a user-friendly input display device by enabling simultaneous display of a control frame and a setup frame.

In order to achieve the above object, a display input device of the present invention includes: a display portion; a touch panel portion; a display controller for displaying a control frame on the display portion; a touch input detector for detecting a touch input to the touch panel portion; and a setup item displaying portion for displaying setup items in a superimposed manner on the control frame in accordance with the position of the touch input while the touch input is being detected by the touch input detector.

The display input device of the present invention may further include a setup item selector for selecting, when, with the setup items being displayed by the setup item displaying portion, another touch input is detected at the position where one of the setup items is displayed, the setup item in the detected position.

The display input device of the present invention may further include a setup item canceller for eliminating the setup items being displayed by the setup item displaying portion when the touch input detector detects cancellation of the touch input.

A program of the present invention is characterized in that to cause a computer including a display portion and a touch panel portion to realize a display function of displaying a control frame on the display portion; a touch input detecting function of detecting a touch input to the touch panel portion; and a setup item displaying function of displaying setup items in a superimposed manner on the control frame in accordance with the position of the touch input while the touch input is being detected by the touch input detecting function.

According to the present invention, when a touch input is being detected by the touch input detector, setup items corresponding to the position of the touch input can be displayed in a superimposed manner on the control frame that is displayed on the display portion. Accordingly, the control frame and the setup items can be displayed at the same time, hence this configuration can provide highly convenient operativity to the user. Further, when the user just wants to display setup items, it is possible for the user to view the setup items by performing a touch input without causing transition from the control frame to a setup frame.

Further, according to the present invention, when, with the setup items being displayed, another touch input is performed at the position where one of the setup items is displayed, it is possible to select the setup item located at the position of the touch input.

Moreover, according to the present invention, when cancellation of the touch input is detected, the setup items being displayed can be eliminated. Accordingly, the user is able to eliminate the setup items so as to display the normal control frame, by just releasing the touch state (releasing the finger or the like from the touch panel portion) after making sure the setting.

DESCRIPTION OF THE PREFERRED EMBODIMENTS

The best mode for carrying out the present invention will be described with reference to the drawings. In the description of the embodiment, a case in which a display input device of the present invention is applied to a digital multifunctional machine will be described as an example.

[Description of Operation]

Figure 1:
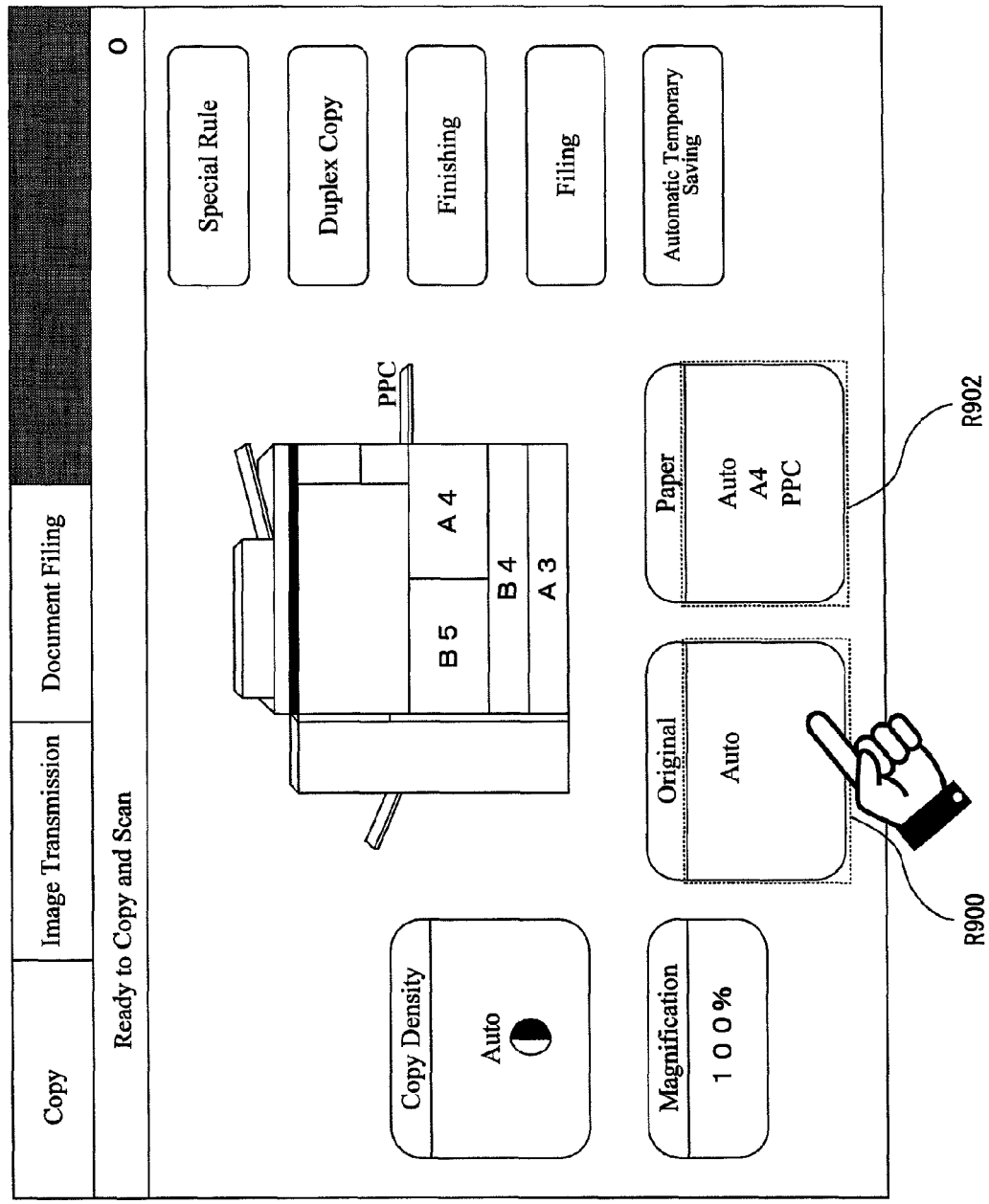
FIG. 1 is a view for illustrating the conventional operation.
Figure 2:
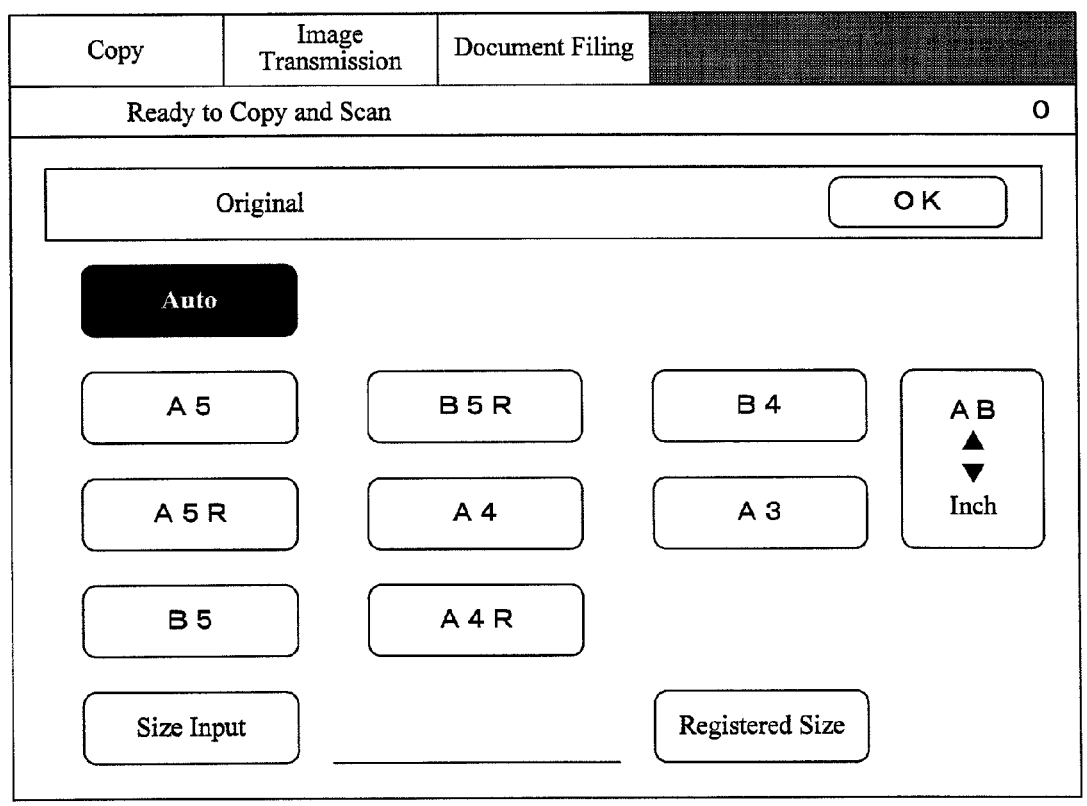
FIG. 2 is a view for illustrating the conventional operation.
Figure 3:
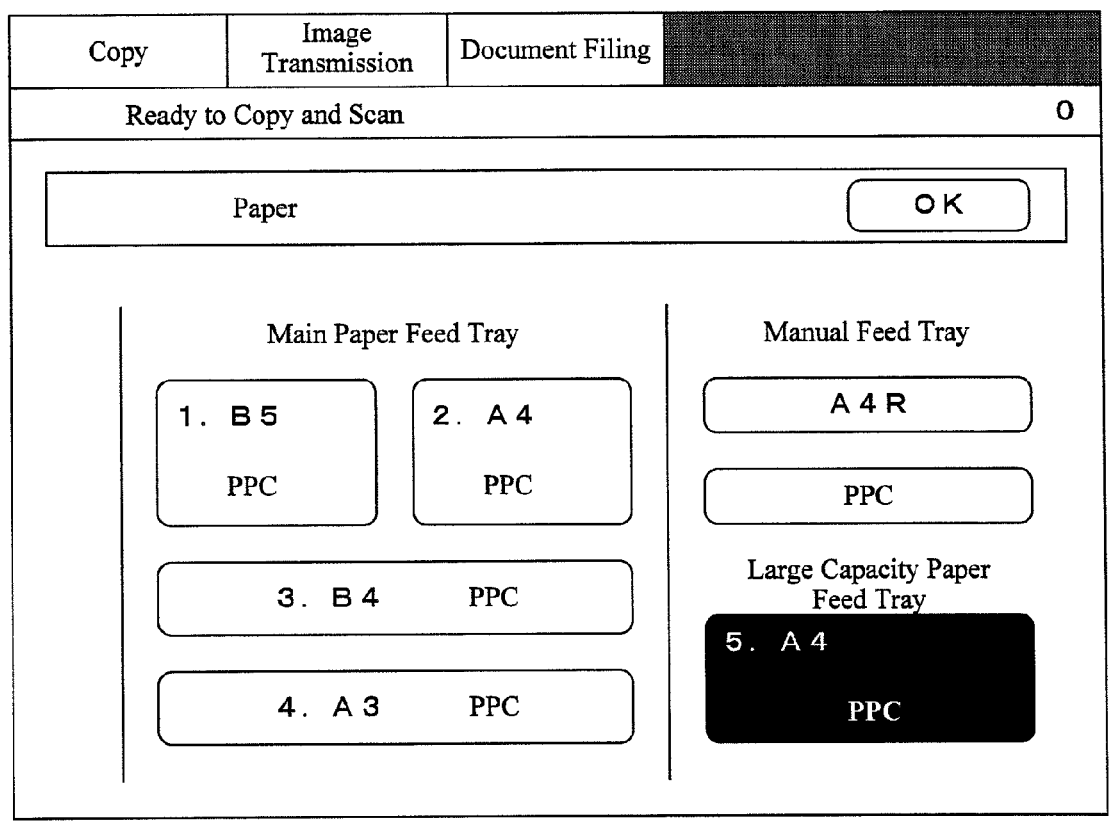
FIG. 3 is a view for illustrating the conventional operation.
Figure 4:
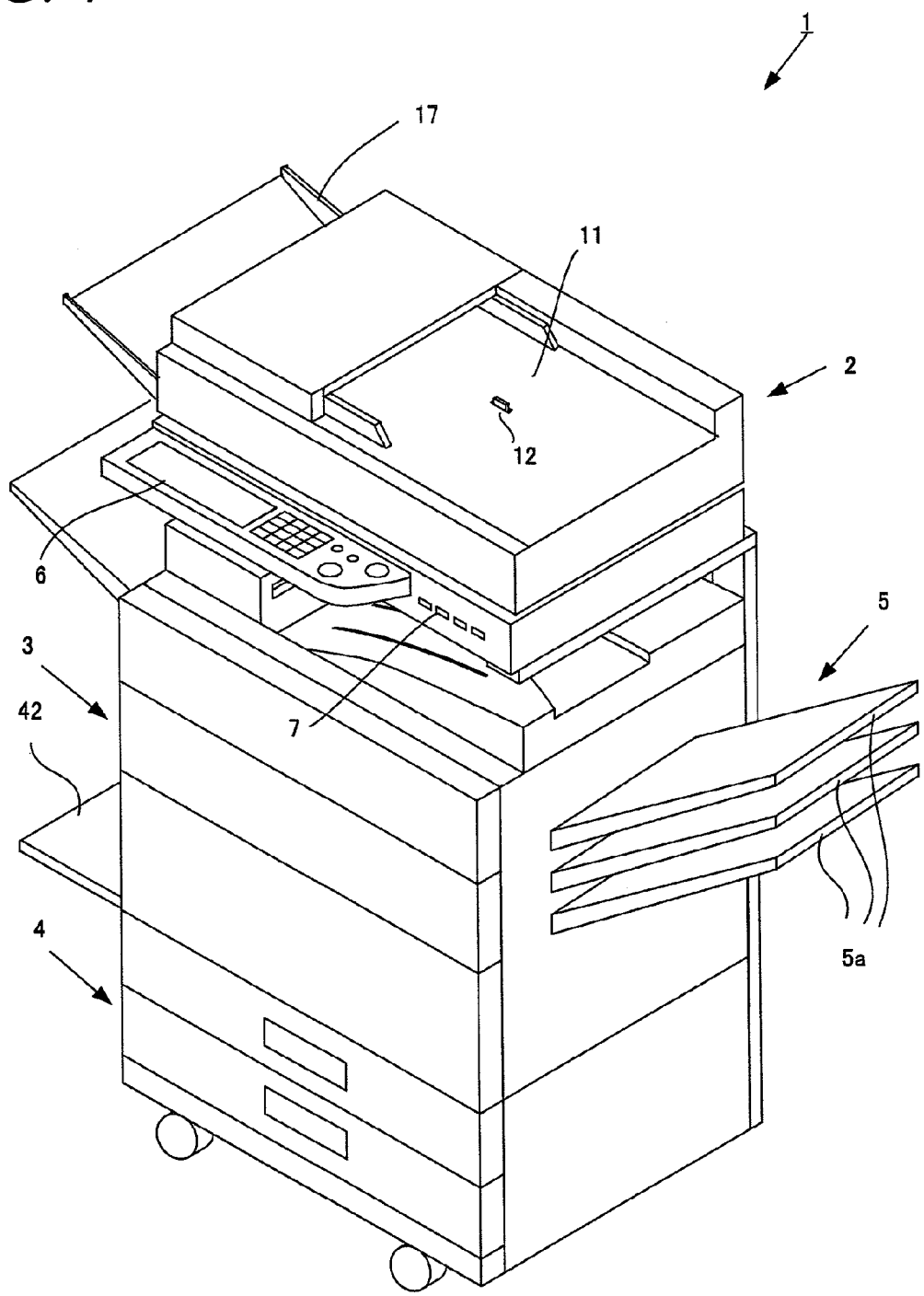
FIG. 4 is a perspective view showing an appearance of a digital multifunctional machine to which the present invention is applied.
Figure 5:
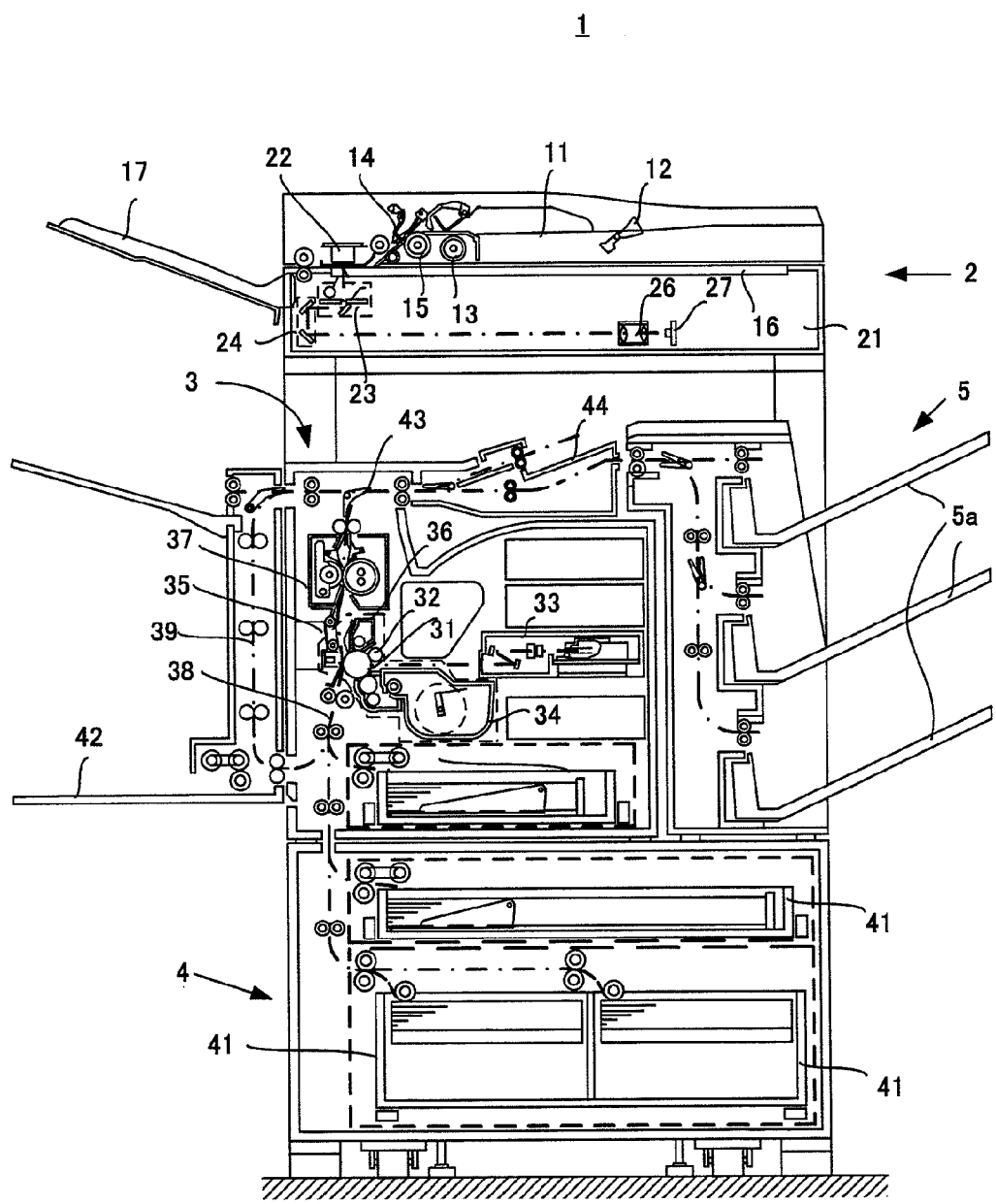
FIG. 5 is a sectional view showing a digital multifunctional machine to which the present invention is applied.

FIGS. 4 and 5 are perspective and sectional views showing one embodied mode of a digital multifunctional machine 1 of the present embodiment. This digital multifunctional machine 1 can be selectively used in copy mode for reading images from originals to print them out on recording sheets, in facsimile mode for reading images from originals to transmit and receiving images of originals to print them out on recording sheets, in printer mode for receiving images from information terminal devices via networks to print them out on recording sheets and in other modes. This digital multifunctional machine 1 essentially includes a document feeding and reading portion 2, an image forming portion 3, a paper feeder 4, a paper discharge processor 5 and a USB interface 7.

Next, the operation of digital multifunctional machine 1 will be described taking an example of the copy mode. To begin with, as documents are set on a document set tray 11 of document feeding and reading portion 2, a document detecting sensor 12 detects the documents having been set. Then, a control panel 6 (FIG. 4) of the document feeding and reading portion 2 is operated so as to input settings of the size of the print paper, magnification ratio, etc. Thereafter, control panel 6 is operated to instruct the start of a copying operation.

In response to the above control, document feeding and reading portion 2 pulls out documents, sheet by sheet, by means of a pickup roller 13 onto document set tray 11 and delivers the document by and between a separation plate 14 and a feed roller 15 to a platen glass 16 so that the document is conveyed in the sub-scan direction over platen glass 16 and discharged to a document output tray 17.

In the above operation, the front side (the under side) of the document is read by a first reader 21. That is, a first scan unit 23 of first reader 21 is moved and positioned into place while a second scan unit 24 is positioned at a predetermined position. The front surface of the document is illuminated through platen glass 16 by the exposure lamp of first scan unit 23, and the light reflected off the document is lead by the reflection mirrors of first and second scan units 23 and 24 to an image focusing lens 26, which focuses the reflected light or the image of the document on a CCD (charge coupled device) 27 to thereby read the image on the front face of the document.

On the other hand, the reverse face of the document (the upper side) of the document is read by a second reader 22. Second reader 22 is disposed over platen glass 16, and includes: an exposure lamp (LED (light emitting diode) array, fluorescent lamp or the like) for illuminating the rear side of the document; a Selfoc lens array for focusing the reflected light from the original per pixel; and a contact image sensor (CIS) for photoelectrically converting the reflected light of the document, received through the Selfoc lens array, to output analog image signals.

Also, the document may be placed on platen glass 16 by unfolding the upper body of document feeding and reading portion 2 so that the document surface can be read by means of first reader 21. In this case, first and second scan units 23 and 24 are moved in the sub scan direction keeping a predetermined speed relationship relative to each other while the document on platen glass 16 is illuminated by first scan unit 23, and the light reflected off the document is lead to image focusing lens 26 by means of first and second scan units 23 and 24 so that the image of the document is focused by image focusing lens 26 onto CCD 27.

When one or both sides of the document have been read in the above way, the image data representing one or dual sides of the document is input to a controller 100 (shown in FIG. 6) of a microcomputer etc., where the image data undergoes various image processes, and the processed image data is output to image forming portion 3.

Image forming portion 3 prints the document images represented by image data on recording paper and includes a photoreceptor drum 31, a charging device 32, a laser scan unit (which will be referred to hereinbelow as LSU) 33, a developing unit 34, a transfer device 35, a cleaning device 36, a charge erasing device (not shown) and a fusing unit 37.

Also, image forming portion 3 is equipped with a main feed path 38 and a reverse feed path 39. The recording paper delivered from paper feeder 4 is conveyed along main feed path 38. Paper feeder 4 draws recording paper, sheet by sheet, from a stack of recording paper, held in a paper feed cassette 41 or set on a manual feed tray 42 and delivers the recoding paper to main feed path 38 of image forming portion 3.

In the course of the recording paper being conveyed along main feed path 38 of image forming portion 3, the recording paper passes through and between photoreceptor drum 31 and transfer device 35 and then passes through fusing unit 37 to complete printing for the recording paper. While photoreceptor drum 31 rotates in one direction, its surface is cleaned by cleaning device 36 and the charge erasing device and then charged uniformly by charging device 32. Laser scan unit 33 modulates the laser beam based on the image data from document feeding and reading portion 2 and repeatedly scans the modulated laser beam over the photoreceptor drum 31 surface in the main scan direction, to form an electrostatic latent image on the photoreceptor drum 31 surface. Developing unit 34 supplies toner to the photoreceptor drum 31 surface and develops the electrostatic latent image to form a toner image on the photoreceptor drum 31 surface. Transfer device 35 transfers the toner image on the photoreceptor drum 31 surface to the recording paper which passes through the nip between the transfer device 35 and photo receptor drum 31. Fusing unit 37 heats and presses the recording paper to fix the toner image onto the recording paper.

Arranged at the junction of main feed path 38 and reverse feed path 39 is a branch claw 43. When printing is performed only on one side of recording paper, the recording paper is positioned by this branch claw 43 and then lead from fusing unit 37 to a paper output tray 44 or paper discharge processor 5 by means of branch claw 43.

When printing is performed on both sides of recording paper, branch claw 43 is rotated to the position indicated by the dashed line so that the recording paper is conducted to reverse feed path 39. Then, the recording paper passes through reverse feed path 39 and is inverted upside down to be fed to main feed path 38 once again. Then, the recording paper is again printed on its rear side through main feed path 38 and lead to paper output tray 44 or paper discharge processor 5.

The recording paper thus printed is lead to paper output tray 44 or paper discharge processor 5 so that it is discharged to paper output tray 44 or discharged to any one of paper output trays 5a of paper discharge processor 5.

In paper discharge processor 5, a plurality of recording sheets are sorted and discharged to different output trays 5a, and/or each set of recording sheets is punched or stapled. For example, when multiple copies of multiple originals are prepared, recording sheets are sorted and discharged to different paper output trays 5a so that one copy of multiple originals is allotted to one paper output tray 5a, and each set of recording sheets on every paper output tray 5a is punched or stapled to prepare a printed matter.

[Configuration]

Figure 6:
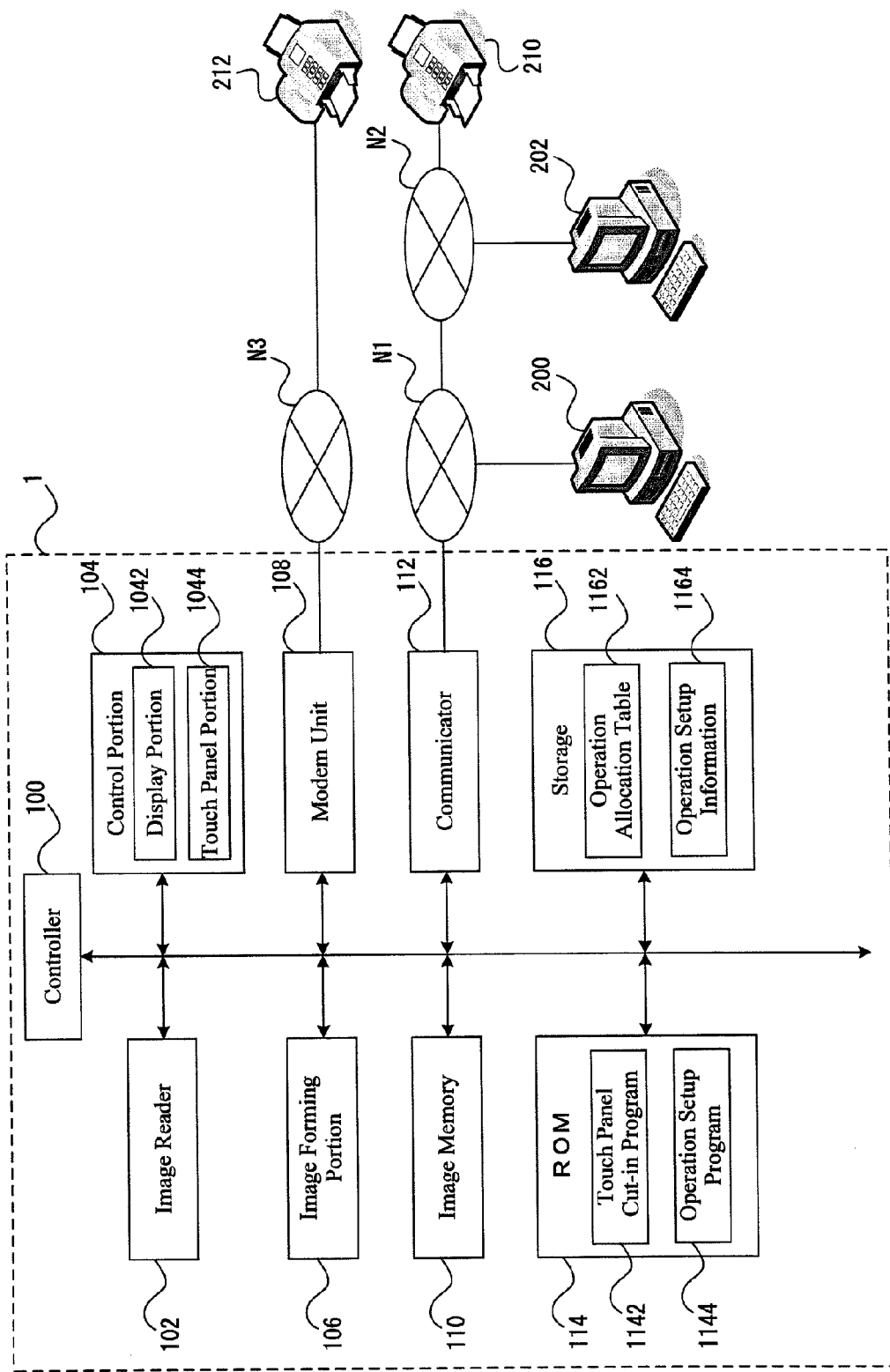
FIG. 6 is a view showing a configuration of a digital multifunctional machine in the present embodiment.

Next, the configuration of digital multifunctional machine 1 will be described with reference to FIG. 6. As shown in FIG. 6, digital multifunctional machine 1 has a controller 100 (a display controller, a touch input detector, a setup item displaying portion, a setup item selector and a setup item canceller), to which an image reader 102, a control portion 104, an image forming portion 106, a modem unit 108, an image memory 110, a communicator 112 and a ROM 114 and a storage 116 are connected. Modem unit 108 is connected to a public telephone network $N_3$, whereas communicator 112 is connected to a network N1.

Controller 100 is a functional unit for performing various operations and control of digital multifunctional machine 1. The controller reads out each program stored in digital multifunctional machine 1 to execute the program so as to achieve the associated process. Here, controller 100 is configured of, for example a CPU (Central Processing Unit) for performing operations.

Image reader 102 is a functional unit for picking up images recorded on recording paper to create image data. Image reader 102 is formed of a scanner or the like for example. Digital multifunctional machine 1 shown in FIG. 4, this corresponds to document feeding and reading portion 2. The image data created by image reader 102 is sent to image memory 110 and temporarily stored therein.

Control portion 104 includes a display portion 1042 for displaying the necessary information for control and a touch panel portion 1044 through which the user inputs information such as control commands etc. In digital multifunctional machine 1 shown in FIG. 4, control panel 6 corresponds to this. Though a ten key pad and other input devices for inputting control commands and other information are provided other than touch panel portion 1044, description of these is omitted in the present embodiment.

Image forming portion 106 is a functional unit for forming images in accordance with the image data stored in image memory 110 and recording (printing) them onto recording paper. For example, the image forming portion may be constructed of, for example a laser printer or the like. In FIG. 4, image forming portion 3 corresponds to this.

Modem unit 108 is a functional unit for performing facsimile communication and is connected to public telephone network N3. The image data created by image reader 102 can be transmitted by facsimile communication to another facsimile machine 212 through public telephone network N3 that is connected to modem unit 108. Also, digital multifunctional machine 1 can receive the image data transmitted from another facsimile machine 212 via public telephone network N3 by modem unit 108 and can form images by image forming portion 106 from the received image data.

Image memory 110 is a memory for temporarily storing image data. Specifically, the image data created by image reader 102 is temporarily stored into image memory 110. Here, the image data that is designated to be printed out is output to image forming portion 106, the image data that is designated to be stored is output to storage 116 and the image data that is designated to be transmitted and received by communication is output to modem unit 108 or communicator 112.

The image data that is received by modem 108 or communicator 112 is also stored temporarily into image memory 110.

Communicator 112 is a functional unit that functions as a communicating means of digital multifunctional machine 1 for transmitting and receiving data via networks. Communicator 112 can be connected to a communication network N1 such as an in-house LAN etc. This communication network N1 has one or a plurality of personal computers (PCs) 200 connected thereto. Here, in a normal state where digital multifunctional machine 1 operates alone, communicator 112 exchanges information with PC 200 via communication network N1.

Specifically, digital multifunctional machine 1 transmits the image data created by image reader 102 from communicator 112 to PC 200. This configuration makes it possible for digital multifunctional machine 1 to function as a scanner device. Conversely, PC 200 transmits image data to digital multifunctional machine 1. Digital multifunctional machine 1 can form images at image forming portion 106 from the image data received at communicator 112. In this case, digital multifunctional machine 1 can function as a printer.

Here, communication network N1 is connected to a wide area communication network N2 such as the internet etc. Modem unit 108 can receive image data from PC 202 or another facsimile machine 210 connected to wide area communication network N2 via communication network N1 and wide area communication network N2, by transmission of image data attached to an email or by any other method. In this way, digital multifunctional machine 1 can function as an internet facsimile machine.

Figure 9:
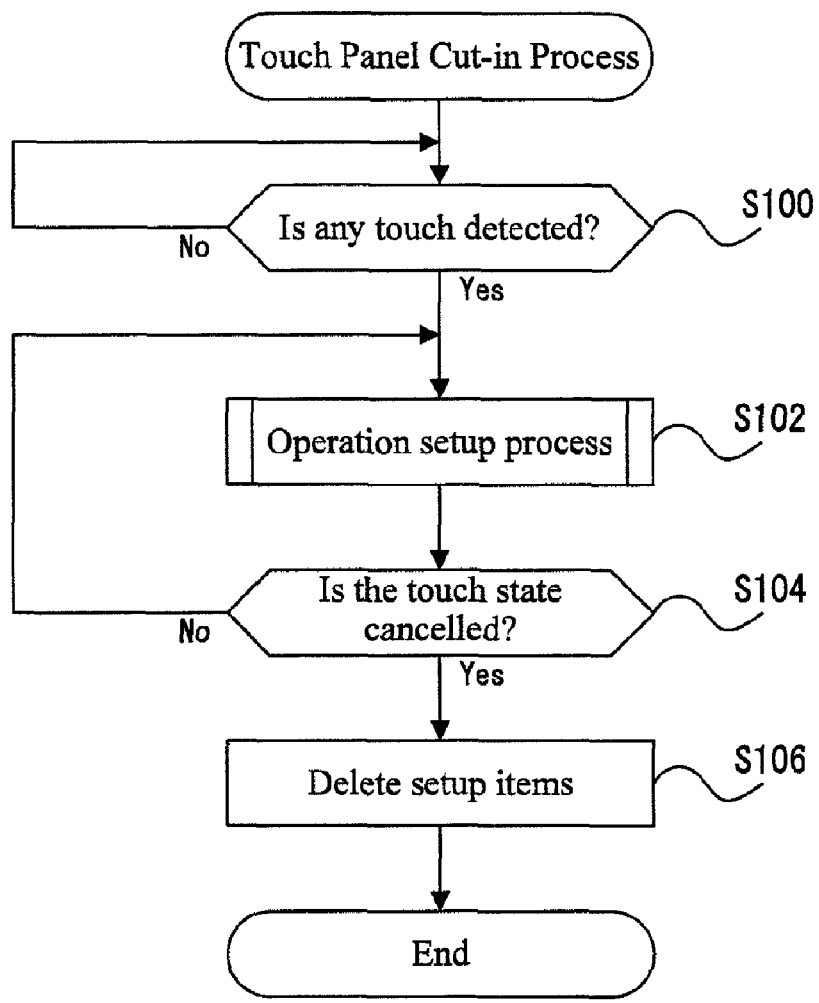
FIG. 9 is a chart showing the operation flow of a touch panel cut-in process in the present embodiment.
Figure 10:
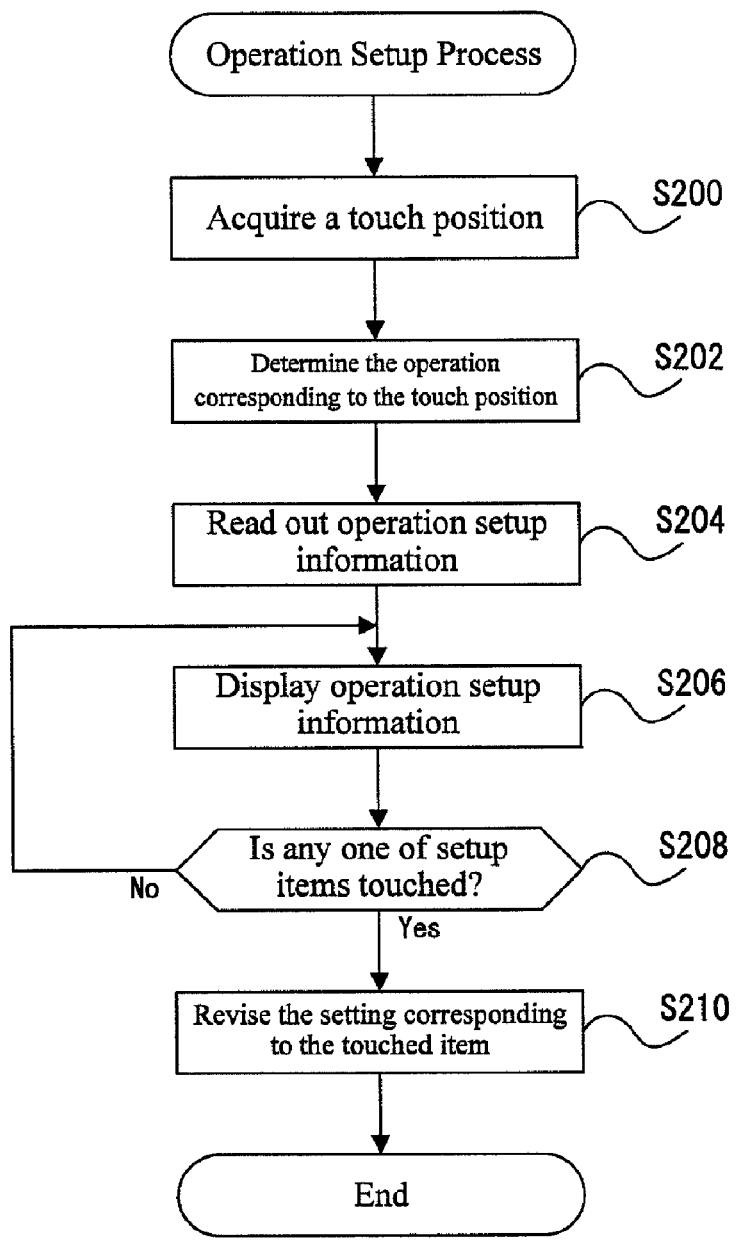
FIG. 10 is a view showing the operation flow of an operation setup process in the present embodiment.

ROM 114 is a functional unit for storing various kinds of data and programs for operating digital multifunctional machine 1. Controller 100 reads out and executes a control program stored in ROM 114 to realize a control process. ROM 114 also has a touch panel cut-in program 1142 and an operation setup program 1144 stored therein. When a touch is detected by touch panel portion 1044, controller 100 reads out and executes touch panel cut-in program 1142 so as to realize a touch panel cut-in process (FIG. 9). Controller 100 also reads out and executes operation setup program 1144 so as to realize an operation setup process (FIG. 10).

Storage 116 is a functional unit for recording the setup status of digital multifunctional machine 1 and saving the image data that is temporarily stored in image memory 110. Here, storage 116 is constructed of any of storage devices including, for example, a semiconductor memory, hard disk drive and optical disk drive. Storage 116 has an operation allocation table 1162 and operation setup information 1164 stored therein.

Figures 7, 8:
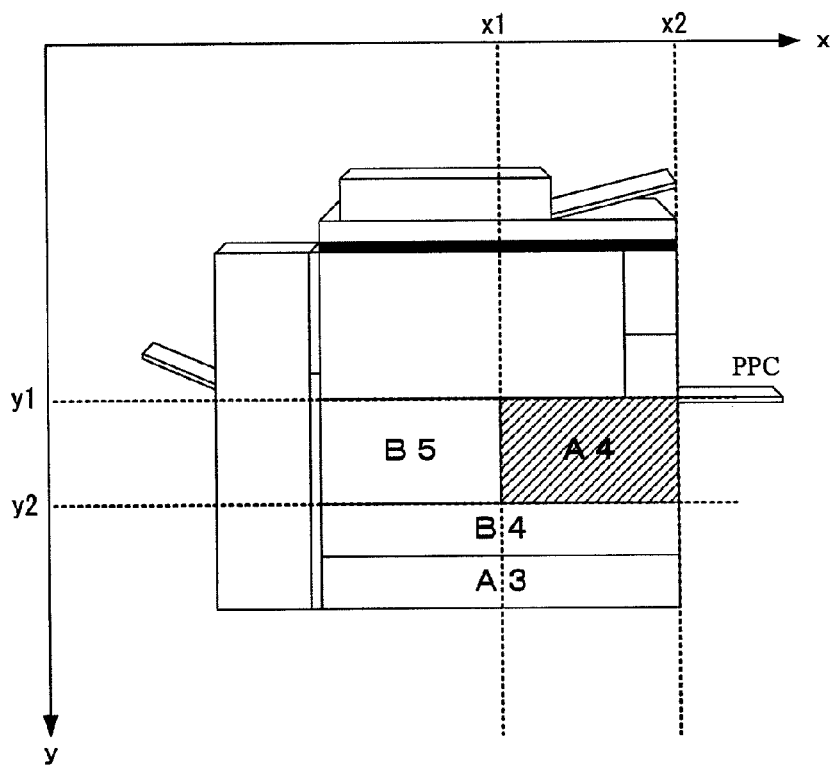
FIG. 7 is a chart showing one example of a data structure of an operation allocating table in the present embodiment.
FIG. 8 is a view for illustrating the operation in the present embodiment.

This operation allocation table 1162 is the table for storing the operations to be set up in accordance with the coordinates at which a touch is detected on touch panel portion 1044. FIG. 7 shows one example of the data structure of operation allocation table 1162.

As shown in FIG. 7, operation allocation table 1162 stores coordinates (e.g., "(x1,y1)-(x2,y2)"), current status (e.g., "control frame") and operation (e.g., "$2^{nd}$ paper cassette setup") in a related manner.

Here, the coordinates indicate a range of coordinate points on touch panel 1044 that is laid over display portion 1042. For example, as shown in FIG. 8, when a rectangular area specified by a top-left vertex coordinate point (x1,y1) and a bottom-right vertex coordinate point (x2,y2) is touched, the operation corresponding to the range of coordinate points is selected.

For example, when the control frame is displayed, if a coordinate point in this range is touched, the operation for "$2^{nd}$ paper cassette setup" is selected.

Operation setup information 1164 stores information relating to various operation settings in digital multifunctional machine 1. For example, "A4" paper size being set for the second paper cassette may be stored, or "auto" being set for the original size may be stored.

[Processing Flow]

Referring next to FIG. 9, a touch panel cut-in process in digital multifunctional machine 1 will be described. The touch panel cut-in process is a process implemented by controller 100 by executing touch panel cut-in program 1142. Specifically, this process is implemented when controller 100 has detected a touch on touch panel portion 1044 or when cancellation of a touch has been detected.

First, when a user's touch on touch panel 1044 is detected (Step S100; Yes), controller 100 starts an operation setup process (FIG. 10) (Step S102). This operation setup process will continue until the aforementioned condition of being touched is cancelled (Step S104; No→Step S102).

Herein, when the aforementioned condition of being touched is cancelled (Step S104; Yes), the setup items being displayed disappear and the display returns to the previous display state (control frame) before the touch panel cut-in process is actuated.

Next, referring to FIG. 10, the operation setup process that is implemented at Step S102 of the touch panel cut-in process will be described. The operation setup process is a process that is implemented by controller 100 as it reads and executes operation setup program 1144.

First, controller 100 acquires the touch position on touch panel portion 1044 (Step S200). Controller 100 then determines the operation corresponding to the touch position (coordinate point) based on the operation allocation table 1162 (Step S202). Controller 100 also reads out the setup items corresponding to the operation and corresponding operation setup information of the setup items (Step S204) and displays the setup items and operation setup information together on display portion 1042 (Step S206).

Here, when a setup item is touched (Step S208; Yes), the operation setup information 1164 in correspondence with the touched item is revised (Step S210).

OPERATIONAL EXAMPLES

Figure 11:
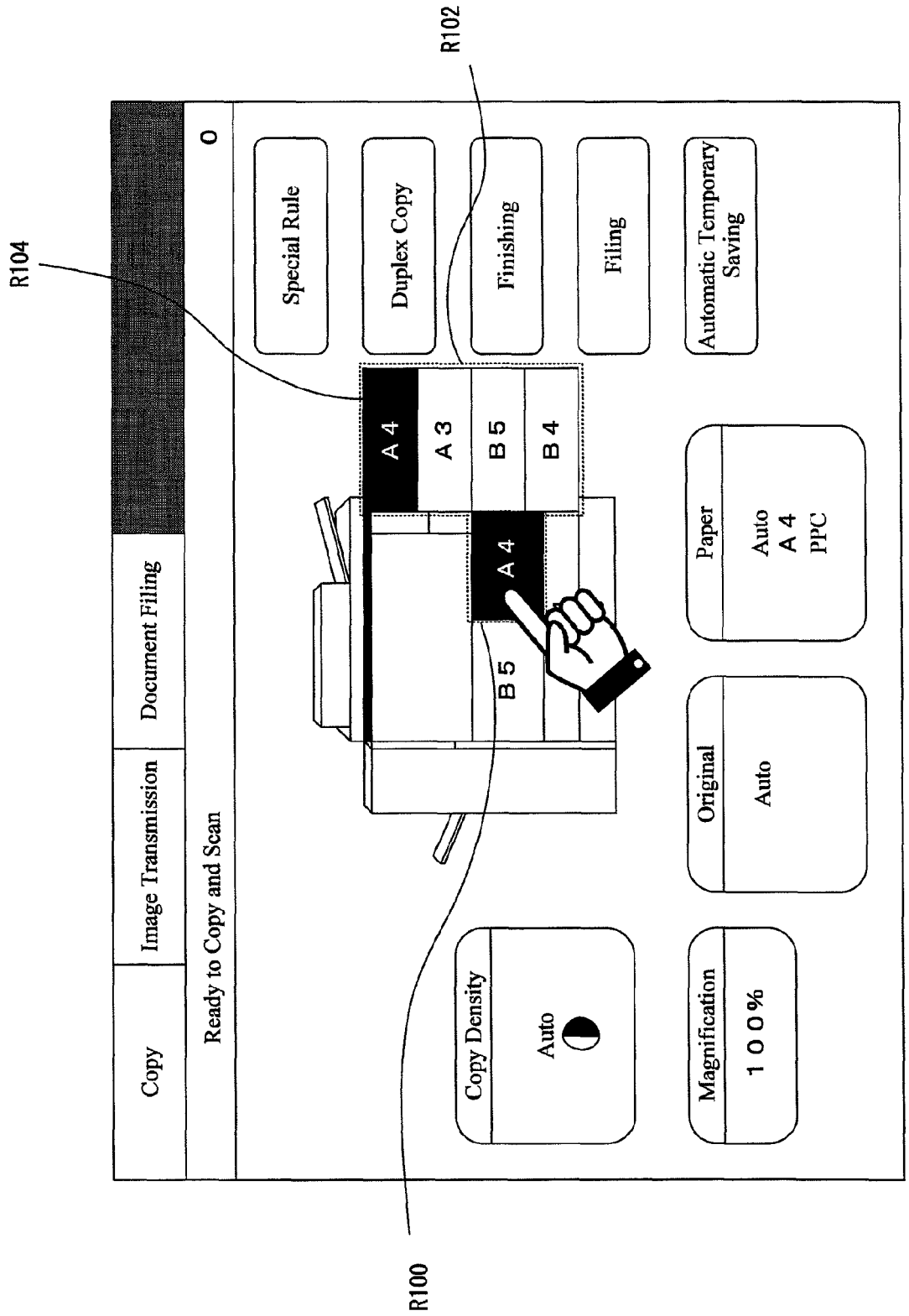
FIG. 11 is a view for illustrating an operation in the present embodiment.

Next, specific operations will be described taking examples of the display states in display portion 1042. To begin with, FIG. 11 shows a display state when the second paper feed cassette is set up.

First, in order to set up the second paper feed cassette, the user touches a region R100 (the first region) on touch panel portion 1044 when the control frame is being displayed on display portion 1042 under control of controller 100 (the display controller). When controller 100 (the touch input detector) detects a state of being touched on touch panel portion 1044, the operation setup process is actuated (Step S100; Yes→Step S102 in FIG. 9).

Then, controller 100 detects the touch position inside touch panel portion 1044 (Step S200 in FIG. 10) and determines the operation corresponding to the touch position by reading operation allocation table 1162 (Step S202 in FIG. 10). In this case, the operation for "setting the second paper feed cassette" is determined.

Then, controller 100 (the setup item displaying portion) displays a window corresponding to this operation in a region R102 (the second region) adjacent to region R100. In this figure, paper sizes "A4", "A3", "B5" and "B4" are read out as the operation setup information for "setting of the second paper feed cassette" and displayed as the options of the setup item (S204→Step S206 in FIG. 10).

At this point, a region R104 representing "A4" is touched while region R100 is being touched (Step S208; Yes in FIG. 10), controller 100 (a setup item selector) selects "A4" for the paper size as "the setting for the second paper feed cassette" and revises the size setting of the paper to be stored in the second paper feed cassette (Step S210 in FIG. 10). As an example of the way of touching, the user may select region R100 with his/her forefinger and select region R104 with his/her middle finger so that the user is able to achieve the setting operation by intuition.

When this state of being touched is canceled, controller 100 (a setup item canceller) eliminates the setup items being displayed, from display portion 1042 and restores the previous display state (control frame) before the touch panel cut-in process is actuated.

Figure 12:
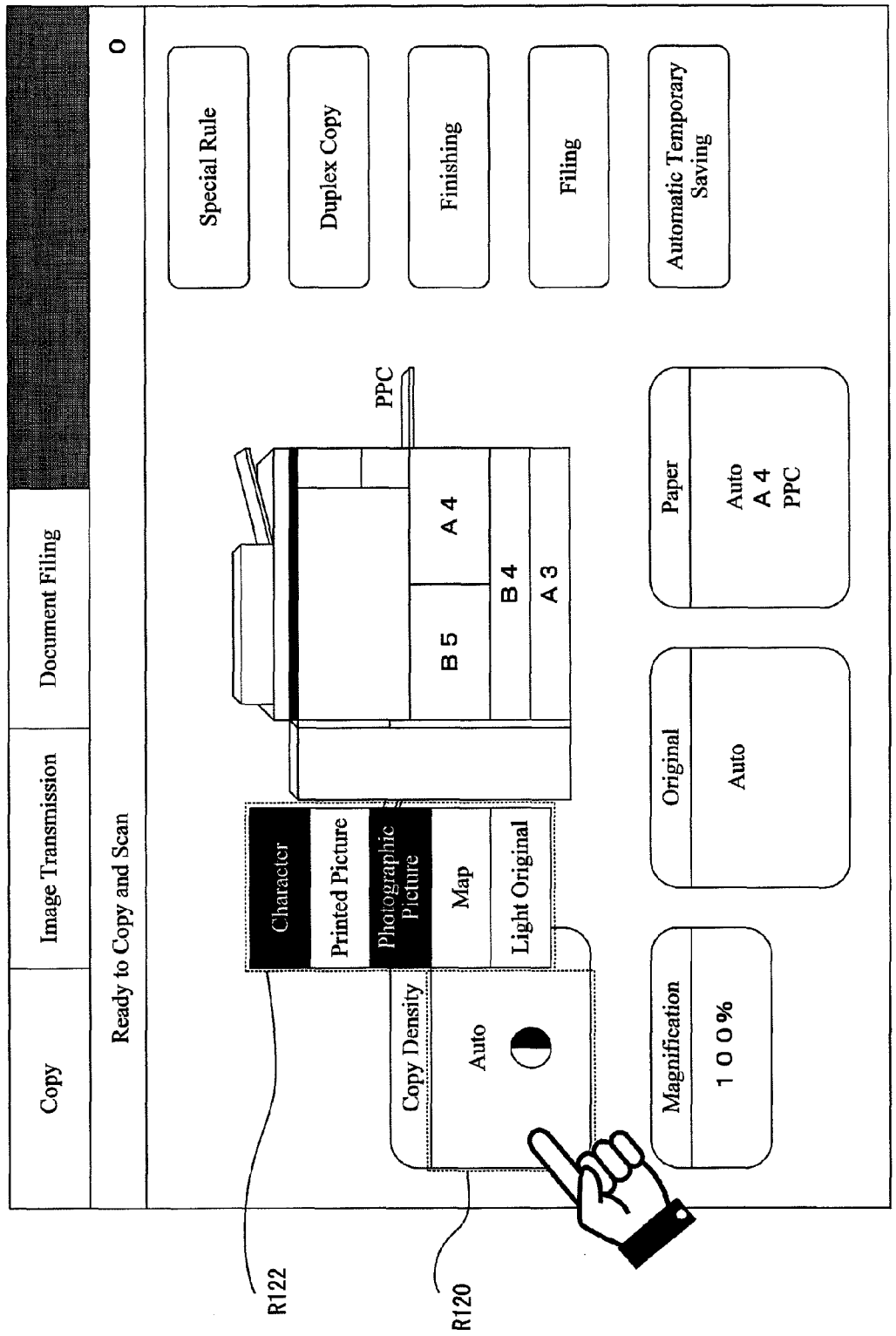
FIG. 12 is a view for illustrating an operation in the present embodiment.

Similarly, FIG. 12 is a view showing a display state when the kind of copy density is designated. As a region R120 for copy density is touched, setting item options for copy density are displayed in a region R122. Specifically, the options include "character" for reading originals including characters alone, "printed picture" for reading pictures printed on plain paper, "photographic picture" for reading pictures printed on photographic paper, "map" for reading maps and "light original" for reading lightly printed originals.

Here, two options may be selected for originals having mixed features. First, as region R120 is touched, setup options are displayed in region R122 next to region R120. Then, multiple options are touched so that multiple items can be designated. In this case, setup for reading originals having contents of "character" and "photographic picture" is permitted.

It is also possible to provide such a feature that the item that has been once selected can be canceled by touching the region for the setup item once again. For example, when the region for the setup item "character" is touched again, the copy density setup of "character" is canceled, so that the copy density setup of "photographic picture" alone is selected.

Figure 13:
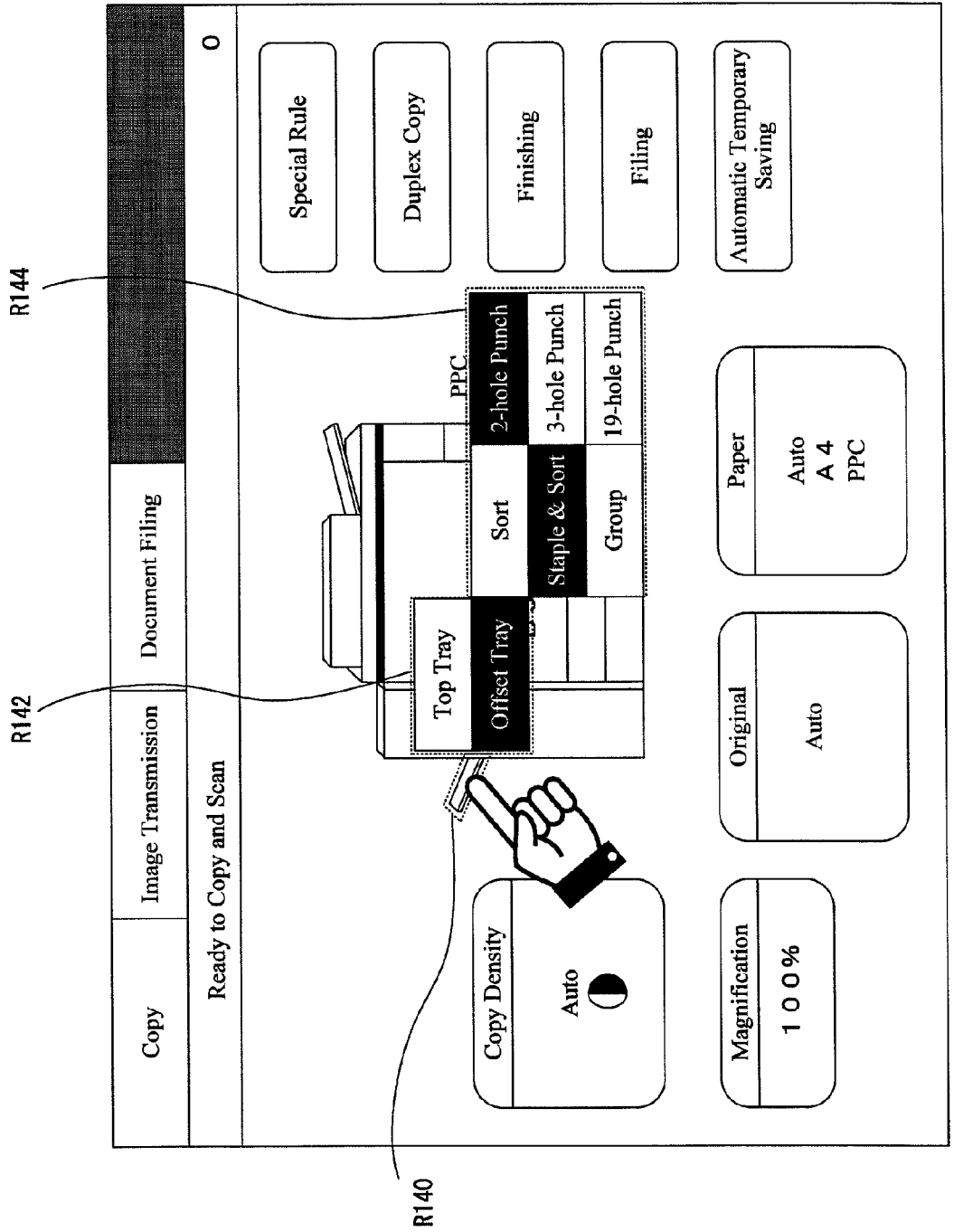
FIG. 13 is a view for illustrating an operation in the present embodiment.

FIG. 13 shows the setup relating to "finishing (the post-processor)". For example, when a region R140 corresponding to the post-processor in the drawing is touched, the setup options relating to "finishing", "top tray" and "offset tray" are displayed in a region R142. In region R142, the "offset tray" area is touched, setup options for "offset tray", "sort", "staple & sort", "group", "2-holed punch" "3-hole punch" and "19-hole punch" are displayed in a region R144.

Here, the user selects one or multiple items so as to revise the setup items for the operation of "offset tray".

Figure 14:
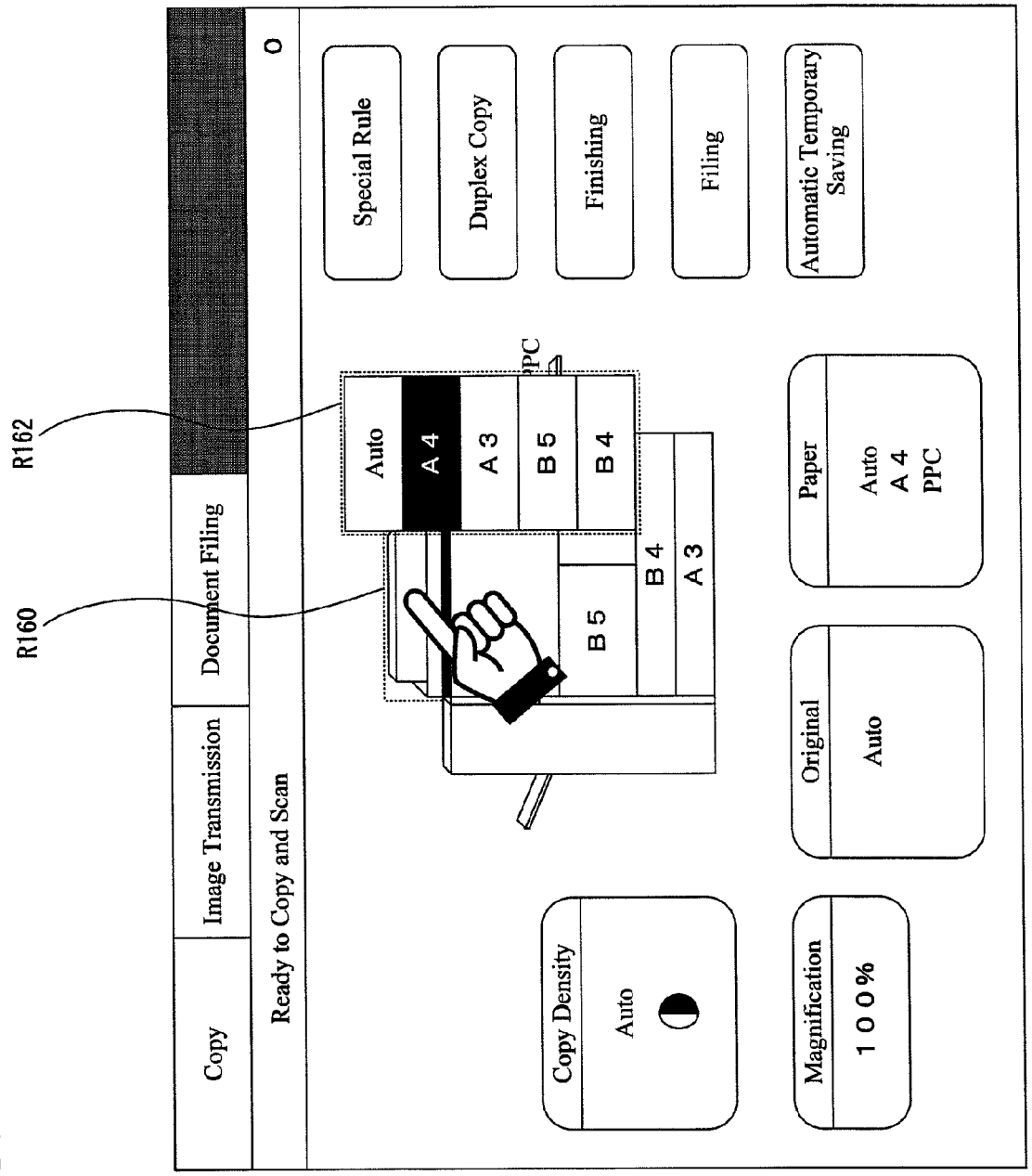
FIG. 14 is a view for illustrating an operation in the present embodiment.
Figure 15:
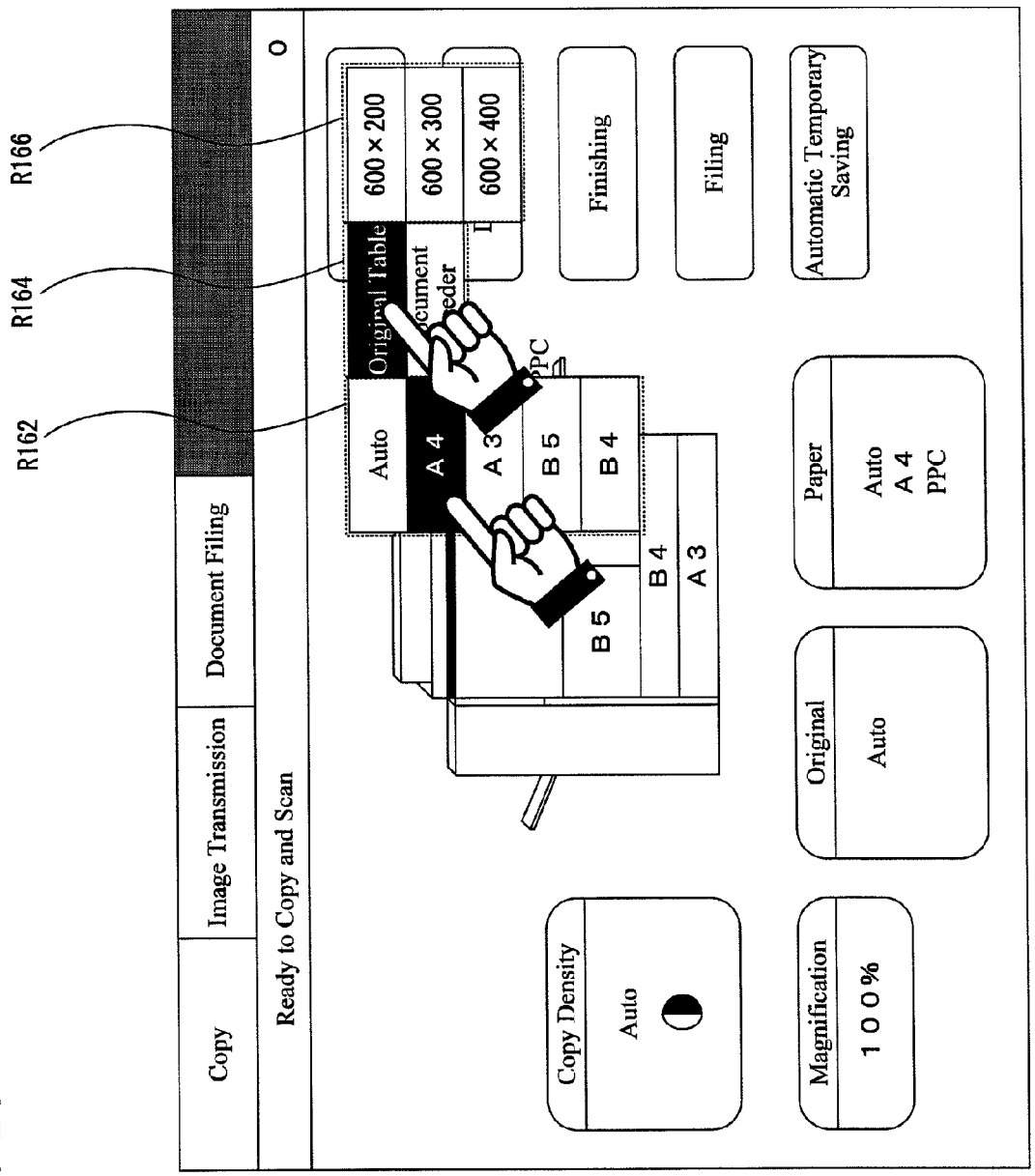
FIG. 15 is a view for illustrating an operation in the present embodiment.

Alternatively, setup items may be designated in a hierarchical manner. For example, FIGS. 14 and 15 are views for illustrating the setting for originals to be read. For example, when a region R160 around the scanner portion in the pictorial representation is touched, setup options for originals to be scanned are displayed in region R162.

In this situation, when the area "A4" is touched among the setup options for the setting for originals to be scanned, setup options for designating the "original scanning mode" or the means through which originals are read and displayed. FIG. 15 shows a state at this moment. As seen in FIG. 15, when the setup option "A4" for original size is touched in region R162, options of original scanning modes are displayed in a region 164. When the area for "original table" is touched, further setup options for "scanning resolution" are displayed in a region R166. In this way, it is also possible to designating the setup items in a hierarchical manner.

VARIATIONAL EXAMPLES

Though the present embodiment has been described taking an example in which the display input device is applied to a digital multifunctional machine, the apparatus to which the present invention can be applied should not be limited to the above machine. That is, it goes without saying that the present invention can be applied to a facsimile machine or a computer system including a processor and a printer or any other apparatus of the same kind.

What is claimed is:

1. A display input device comprising:
a display portion;
a touch panel portion;
a display controller for displaying a control frame on the display portion;
a touch input detector for detecting a touch input to the touch panel portion;
a setup item displaying portion for displaying setup items simultaneously with the control frame by superimposing the setup items on the control frame in a position that corresponds to the position of the touch input while the touch input is being detected by the touch input detector; and
a setup item canceller for removing the setup items displayed by the setup item portion when the touch input is no longer detected.

2. The display input device according to claim 1, further comprising a setup item selector for selecting, when, with the setup items being displayed by the setup item displaying portion, another touch input is detected at the position where one of the setup items is displayed, the setup item in the detected position.

3. A computer-readable medium, having stored there on computer-executable instructions that cause one or more processors to perform the steps of:
displaying a control frame on a display portion;
detecting a touch input to a touch panel portion;
displaying setup items simultaneously with a control frame by superimposing the setup items on the control frame in a position that corresponds to the position of the touch input while the touch input is being detected by the touch input detecting function; and
removing the setup items displayed on the control frame when the touch input is no longer detected.

4. A method for simultaneously displaying a device's control options and the device's setup options comprising:
displaying the control options on a display screen;
detecting a touch input on a touch panel;
upon the touch panel receiving touch input, displaying setup options that correspond to the position of the touch input by superimposing the setup options on top of a portion of the control options in a position that corresponds with the touch input while the touch input is detected; and
removing the setup items displayed on the control options when the touch input is no longer detected.

* * * * *